(12) United States Patent
Harris et al.

(10) Patent No.: US 7,436,878 B1
(45) Date of Patent: Oct. 14, 2008

(54) METHOD AND APPARATUS FOR EFFICIENT CARRIER BIN SEARCH FOR A COMPOSITE SPREADING CODE

(75) Inventors: Johnny M. Harris, Centerville, UT (US); Samuel C. Kingston, Salt Lake City, UT (US); Thomas R. Giallorenzi, Riverton, UT (US); Eric K. Hall, Holliday, UT (US); Richard B. Ertel, Midvale, UT (US)

(73) Assignee: L-3 Communications Corporation, New York, NY (US)

( * ) Notice: Subject to any disclaimer, the term of this patent is extended or adjusted under 35 U.S.C. 154(b) by 676 days.

(21) Appl. No.: 11/136,943

(22) Filed: May 24, 2005

(51) Int. Cl.
*H04L 27/30* (2006.01)
(52) U.S. Cl. .................. 375/142; 375/150; 370/320; 370/479
(58) Field of Classification Search ............... 375/142, 375/143, 147, 150, 152, 343; 370/320, 342, 370/441, 479
See application file for complete search history.

(56) References Cited

U.S. PATENT DOCUMENTS

| | | | | |
|---|---|---|---|---|
| 5,414,728 | A * | 5/1995 | Zehavi ..................... | 375/142 |
| 6,044,074 | A | 3/2000 | Zehavi et al. ............. | 370/350 |
| 6,163,533 | A | 12/2000 | Esmailzadeh et al. ...... | 370/342 |
| 6,366,626 | B1 * | 4/2002 | Boyd ........................ | 375/343 |
| 6,466,958 | B1 * | 10/2002 | Van Wechel et al. ....... | 708/422 |
| 6,633,616 | B2 * | 10/2003 | Crawford ................... | 375/326 |
| 6,728,225 | B1 | 4/2004 | Ozluturk ................... | 370/320 |
| 6,754,195 | B2 | 6/2004 | Webster et al. ............ | 370/335 |
| 7,065,373 | B2 | 6/2006 | Rodgers et al. ............ | 455/502 |
| 7,315,590 | B1 * | 1/2008 | Okuyama et al. .......... | 375/344 |
| 2002/0073223 | A1 | 6/2002 | Darnell et al. ............. | 709/232 |
| 2004/0218533 | A1 | 11/2004 | Kim et al. .................. | 370/235 |
| 2005/0058121 | A1 | 3/2005 | Santhoff et al. ............ | 370/352 |
| 2005/0195770 | A1 | 9/2005 | Baliga et al. ............... | 370/335 |
| 2006/0172711 | A1 | 8/2006 | King et al. ................. | 455/101 |
| 2006/0227750 | A1 | 10/2006 | Soltanian et al. ........... | 370/335 |
| 2007/0092261 | A1 | 4/2007 | Fan et al. ................... | 398/158 |
| 2007/0211678 | A1 | 9/2007 | Li et al. ..................... | 370/338 |

OTHER PUBLICATIONS

Yao, Y., et al., "A Two-Layer Spreading Code Scheme for Dual-Rate DS-CDMA Systems", IEEE Transactions on Communications, vol. 51, No. 6, Jun. 2003, p. 873-879.

* cited by examiner

*Primary Examiner*—Dac V Ha
(74) *Attorney, Agent, or Firm*—Harrington & Smith, PC

(57) ABSTRACT

A matched filter decorrelator is described for efficiently performing a carrier frequency search while despreading a P/N long code constructed from two or more constituent codes such as codes A, B, C. The received signal is phase rotated into a frequency bin and partially despread, preferably over all but one of the constituent codes. To despread the final constituent code, the partially despread signal is input in parallel into frequency bins, where a phase rotator sets each input to a different bin. The frequency bins are then despread in parallel over the final constituent code, and an energy peak in one accumulator indicates which bin is the carrier frequency. Alternatively, a Fourier transform could be used over each of the frequency bins. By partially despreading prior to division into carrier frequency bins, hardware and computational burden are reduced as compared to prior art decorrelators. The present invention is particularly apt for use with an acquisition burst in a secure network.

21 Claims, 11 Drawing Sheets

METHOD AND APPARATUS FOR EFFICIENT CARRIER BIN SEARCH FOR A COMPOSITE SPREADING CODE

CROSS-REFERENCE TO RELATED APPLICATIONS

This application is related to co-owned U.S. patent application Ser. Nos. 11/136,783, 11/136,782, and 11/136,789, filed the same date as this application. Those related applications are hereby incorporated by reference.

FIELD OF THE INVENTION

The present invention relates to signal acquisition, specifically, searching among a range of carrier frequencies to acquire a signal whose frequency is unknown, such as due to Doppler uncertainty. It is particularly advantageous for spread spectrum communication systems where a spreading code is a composite code made from combining two or more constituent codes.

BACKGROUND

In digital spread spectrum (DSS) communication, a wide band carrier signal is modulated by a narrow band message signal. The wide-band carrier is typically generated by modulating a single frequency carrier using a pseudo-random noise (P/N) code sequence. The data rate at which a message is communicated is usually much lower than the P/N code symbol or "chip" rate. The ability of DSS to suppress interference is proportional to a ratio of the chip rate to data rate. In many applications, there are thousands of code chips per data bit.

At the receiver, a carrier replica is generated by reducing the DSS signal to baseband and multiplying it with a locally generated replica of the original narrow-band carrier using a local oscillator. If the frequency and phase of the carrier replica is the same as that of the received original narrow-band carrier, then the multiplier output signal will be the product of the bipolar P/N code and intended message. The P/N code is removed by multiplying the wide-band data stream with the locally generated replica of the P/N code that is time aligned with the received P/N code. This is the de-spreading process.

Generating the carrier replica with proper carrier frequency and phase and generating the P/N code replica at the proper rate and time offset is a complex problem. In many DSS communication systems, the necessary carrier frequency, carrier phase, and PIN code offset are not known a priori at the receiver, which tries different values until a large signal is observed at the data-filter output. This is termed the search or acquisition process, and a DSS signal is said to be acquired when the proper frequency, phase, and code offset have been determined. A receiver selects and detects a particular transmitted signal by choosing the appropriate P/N code and performing the acquisition search. In some cases the acquisition search must include examination of different PIN codes from a known list when the transmitting node is not known, as is the likely scenario in FIG. 1. When many different codes, code offsets and carrier frequencies must be examined and the SNR is low, the acquisition task can be both time and energy consuming.

The above constraints are more pronounced in a secure environment such as that depicted in FIG. 1 (detailed below), where a new node termed a hailing node 34 seeks to join an existing network while maintaining security for the joining node and those nodes already on the network. In addition, an established network requires a method of discovering the existence of another separate network that may have migrated into communication range, so that a cross-link can be established between the networks in order to form a larger network. This process of nodes "discovering" each other is termed herein node discovery, and is where DSS signal acquisition occurs. Typically, node discovery is done on channels separate from the primary data communication channels. Limited data exchange on the 'discovery channel' is preferable for network optimization. As a result, the discovery waveform must be flexible in the messages it carries and not be constrained to one specific message type or size.

The air interface should consist of a flexible and symmetric full-duplex or half-duplex link. The transmitting node or hailing node is that node that sends a discovery burst, essentially a message inquiring as to the presence of receiving nodes. Receiving nodes are the nodes that listen for that discovery burst. The receiving nodes are therefore target nodes, which may already have formed a network. These receiving nodes may become transmitting nodes when they send an acknowledgement back to the initiating new node. In this way, a new node that flies into range of an established network will transmit burst discovery messages on that transmitting node's transmit link. When a receiving node in the established network hears the discovery message on its receive link, it will respond via its transmit link which is the hailing node's receiving link. Subsequent handshaking can then be performed via the two node's transmit and receive links to bring the initiating new node into the network. The transmitting and receiving links may occupy separate time slots in a time division duplex (TDD) system, or may be separate frequency bands in a frequency division duplex (FDD) system.

An exemplary but non-limiting environment in which node discovery may be important is illustrated in perspective view at FIG. 1, a prior art arrangement of disparate nodes operating in a traffic data network and one hailing node seeking to join the traffic network. The nodes may be airborne as in aircraft; terrestrial as in autos, trucks, and trains; or waterborne as in ships and other surface watercraft. They may be stationary or mobile, fast or slow moving, as for example, communications between nodes in a building, an aircraft, and an auto. For additional flexibility, it is assumed that a hailing node 34 may not have a clock signal synchronized with the network prior to joining. The range 22 of the traffic data network is centered on a command node 24, absent relays by other nodes within the network. Where the network links members via a satellite link, the line-of-sight range 22 is not particularly relevant. The range 22 is included to show further advantages of the invention that may be exploited when network communications are geographically limited.

The command node is representative of the node that receives the discovery burst, and may be a true command node that controls access to the secure network (in that no other nodes receive and acknowledge discovery bursts) or it may represent any node already established within the network that receives a discovery burst (such as where all established nodes listen for discovery bursts). In FIG. 1, all nodes depicted as within the traffic network range 22 communicate on the traffic network, either through the command node 24 or directly with one another once granted network entry. The traffic network typically operates by directional antennas 24a, at least at the command node 24, to maximize the network range 22. This is because directional antennas typically enable a higher antenna gain and a higher tolerable path loss as compared to omni-directional antennas. Therefore, a range (not shown) of a discovery network that operates using omni-directional antennas 24b is somewhat less, at least in the prior art. The command node 24 maintains communication with stationary nodes 26, 28. When two nodes are aircraft, they may be closing or separating from one another at very high rates, rendering Doppler effects significant. When a hailing node 34 sends a discovery burst to locate and request entry into the traffic network, its signal is typically not received at the command node 24 until the hailing node is within the traffic network range 22. Since the hailing node 34 is not yet identified as authorized, this potentially puts communications within the network at risk, or alternatively unduly delays granting the hailing node 34 access to the network. Because access to the traffic network is obtained through the discovery protocol, that protocol must exhibit security features to prevent compromise of the traffic network.

Considering the issues apparent in light of FIG. 1, a good node discovery scheme for a highly secure communications network would therefore exhibit (a) high speed and reliability; (b) long range; (c) low probability of intercept (LPI) and low probability of detection (LPD) by unauthorized parties; (d) universal discovery and recognition among the various nodes; (e) asynchronous discovery; and (f) reliability for both stationary and fast-moving nodes. Each of these aspects are detailed further at co-owned and co-pending U.S. patent application Ser. No. 10/915,777, herein incorporated by reference in its entirety.

One of the challenges in the secure environment of FIG. 1 is that there is a wide range of carrier frequencies over which to search for a hailing node's burst, due to the very large Doppler uncertainty. Increasing the length of the burst preamble adversely affects LPI. While massively paralleled burst receivers each continuously monitoring a bin of the frequency range might overcome the problem, such a brute force approach is too intensive in hardware, computational complexity, and power consumption for practical use in mobile systems that in many instances are confined to relatively small housings with limited power supplies. What is needed in the art is a more elegant approach to search carrier bins to resolve a Doppler uncertainty, consistent with the security concerns noted above.

SUMMARY OF THE INVENTION

In accordance with one aspect, the present invention is in one aspect a method for decorrelating a received signal that is spread with a composite spreading code, where the composite spreading code is made from at least a first and a second constituent code. The method includes phase rotating a received signal to place the signal into a frequency bin, and despreading the phase rotated signal with a first spreading code to achieve a partially despread signal. Further in the method, a second constituent code is applied to the partially despread signal among a plurality of frequency bins. Outputs from each of the frequency bins are accumulated into a bin-specific accumulator. In the method, the decorrelated signal is evident by an energy peak in one of the bin-specific accumulators.

Further, the invention is in one aspect a decorrelator for despreading a composite spreading code, where the composite spreading code is made from at least a first and a second constituent code. In this aspect, the decorrelator includes a first level phase rotator, a first and second stage, and a plurality of accumulators. The first-level phase rotator is for rotating a frequency of an input signal into a particular frequency bin. The first stage has an input coupled to an output of the first level phase rotator, and is for despreading the phase rotated signal with a first constituent code to achieve a partially despread signal. The second stage has an input coupled to an output of the first stage, and is for applying a second constituent code to the partially despread signal among a plurality of frequency-specific bins. The plurality of accumulators each has an input coupled to an output of the second stage.

Further details of various embodiments of the above are explored below. These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The present invention is described below more particularly with reference to the following drawing figures, which are not to scale except where stipulated.

DETAILED DESCRIPTION

Figure 1:
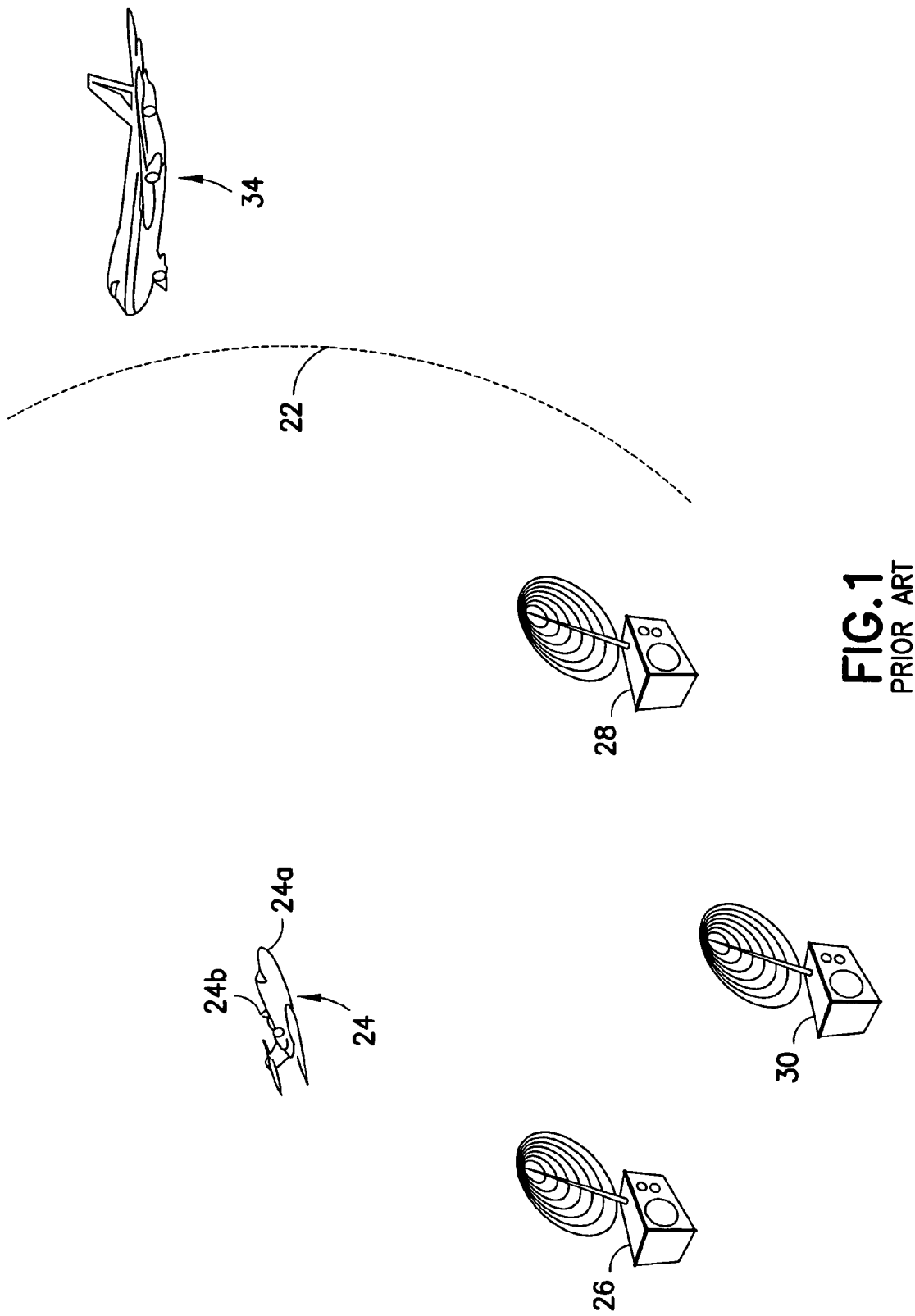
FIG. 1 is a schematic diagram of a particularly challenging prior art communication system in which a hailing node seeks entry into a communication network, and is an apt environment for the present invention.

Consider again FIG. 1. A hailing node 34 seeking entry into the network is unaware of the location of the command 24 or other nodes already communicating on the network. Communication on the traffic channels may be done with a very long P/N code for high security, but discovery of new nodes such as the hailing node 34 generally operate with less complex PN codes apart from traffic P/N codes to ensure security for the longer traffic codes. The present invention is particularly described in the context of a discovery protocol for a hailing node 34 to join the secure communications network of FIG. 1.

Figure 2A:
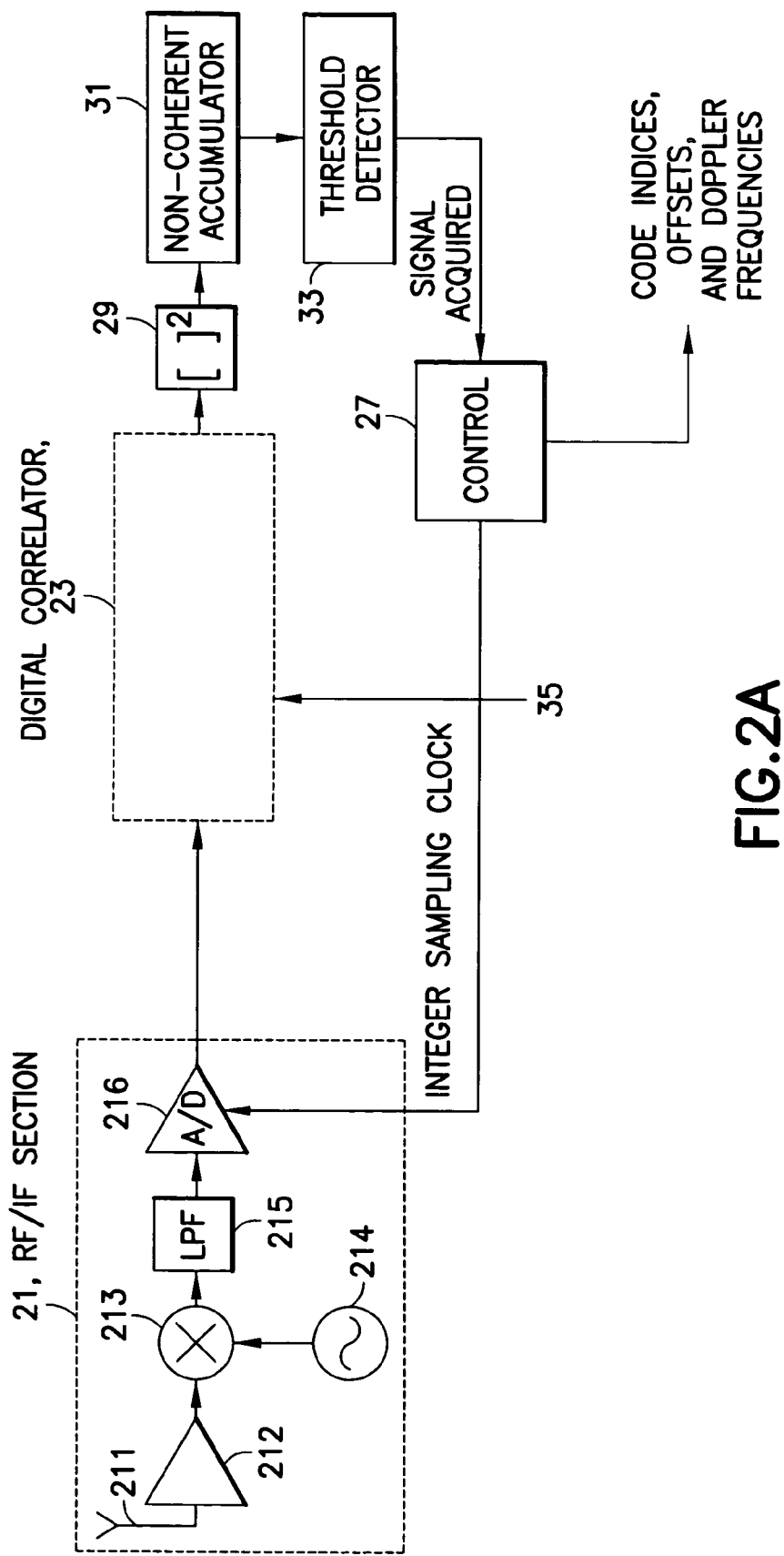
FIG. 2A is a schematic block diagram of a prior art receiver in which the decorrelators of the present invention may be disposed.

FIG. 2A is a schematic block diagram of a prior art receiver using conventional serial acquisition architecture including a serial decorrelator. The signal acquisition architecture comprises an RF/IF (radio frequency/intermediate frequency) tuner section 21 including an antenna 211, an RF amplifier 212, a mixer 213 and local oscillator 214, and a low pass filter 215 which supplies a received and down-converted signal to an analog-to-digital (A/D) converter 216. The A/D converter 216 typically samples and converts at an integer multiple of the replica C/A code chip rate and supplies a digital sequence to a prior art serial digital decorrelator 23 having a series of multipliers and a coherent accumulator. The prior art decorrelator is described with reference to FIG. 2B below, but its output is squared by a multiplier 29 that squares its input, and the squared output is summed in a non-coherent accumulator 31, yielding a non-coherent integration of the coherent processing results. When a signal is acquired, a control 27 monitors the associated phase, code offset, and frequency, and the search is either continued with a new P/N code from a list or stopped if the signal has been acquired with sufficient confidence as determined by a threshold detector 33.

Additional inputs 35 to the decorrelator 23 may include tap weights, code offsets, frequencies and local-oscillator frequency error assumed by control 27. To insure detection of the signal, the RF/IF section 21 must generate both an in-phase (I) and a quadrature (Q) output signal (not shown in FIG. 2A), and the two signals must be processed for signal acquisition. The conventional approach shown in FIG. 2A requires the receiver output data from RF/IF section 21 to be processed as soon as it is available, and processing is constrained by the code rate in the received signal.

Figure 2B:
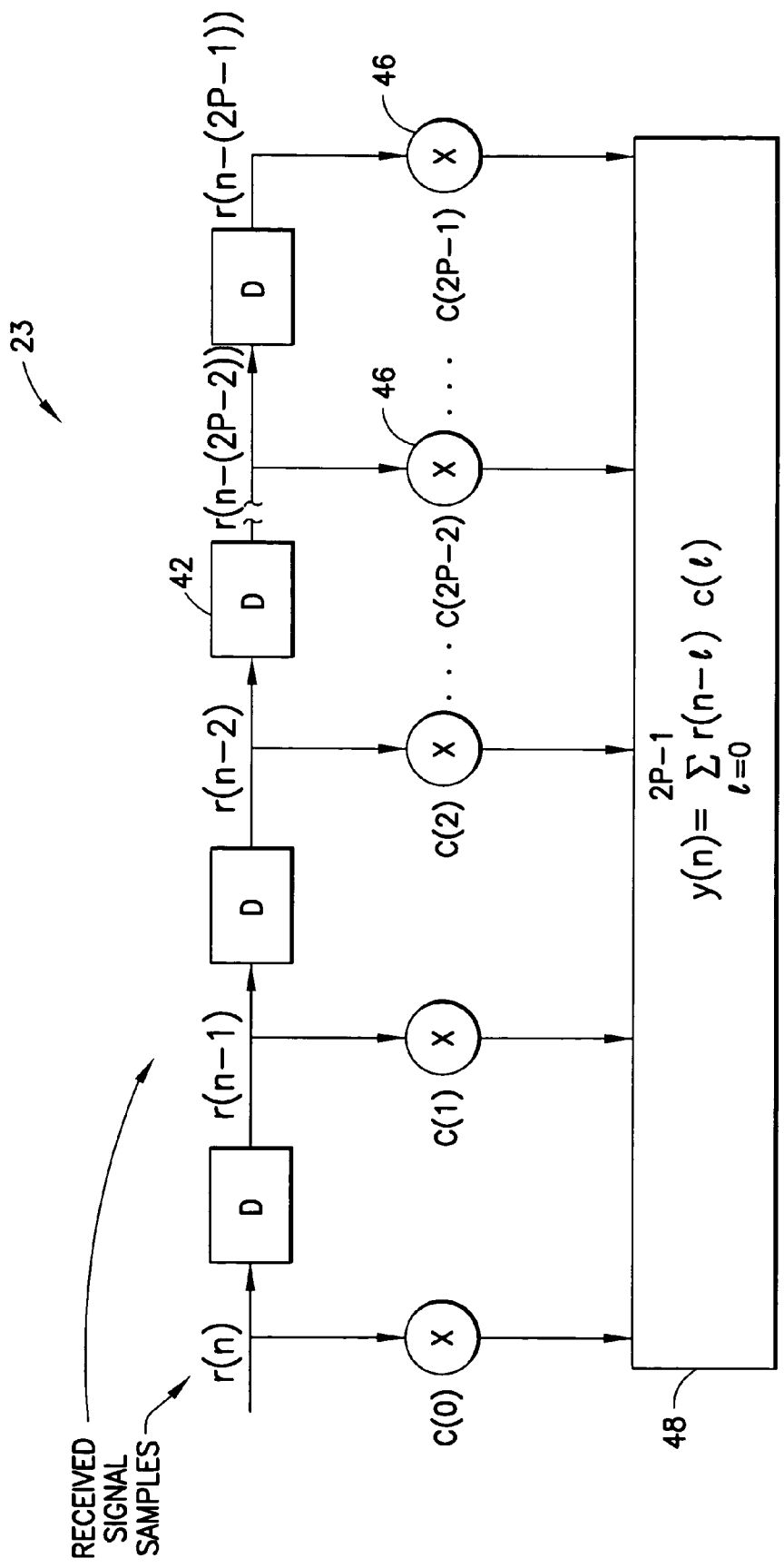
FIG. 2B is a schematic block diagram of a prior art decorrelator 40 that is operable with any generic spreading code

FIG. 2B is a schematic block diagram of a typical prior art serial decorrelator 23 that is operable with any generic spreading code, and may be located at position 23 of FIG. 2A. Assume the spreading code is length P. The decorrelator 23 of FIG. 2B is clocked at twice the chip rate. Digital samples of a received signal r(n), such as those output from the RF/IF section 21, are input into a serial line of (2P−1) unit delay elements 42, where each sample is tapped and multiplied 46 by a spreading code value or tap weight that is known to the receiver, such as via a training sequence or prior programming. The output of each multiplier 46 is input into a PNCA accumulator 48. As each sample r(n) incrementally moves along the unit delay elements 42, a new value y(n) is present in the PNCA accumulator 48. Once the samples r(n) at the taps 44 are aligned with the proper code as applied at the multipliers 46, energy in the PNCA accumulator 48 is maximized and the receiver determines that the samples r(n) are properly aligned with the code values/tap weights [e.g., C(0), C(1), . . . ] at the multipliers 44. Squaring the output of the PNCA accumulator 48, such as shown at the multiplier 29 of FIG. 2A, enhances this energy peak. For a doubled chip rate as illustrated (two samples per chip), the same code value/tap weight is applied at adjacent pairs of multipliers 44. This prior art approach is acceptable in many telecommunication systems. However, the secure communications environment of FIG. 1 requires a faster acquisition time, so that the hailing node can be identified within one acquisition burst preamble with high efficiency to reduce the probability of detection. Were the despreader of FIG. 2B to be used, the hailing node 34 would need to re-transmit its acquisition burst a sufficient number of times to allow the command node 24 to process 2P samples, which increases greatly the probability of both detection and intercept.

The present invention is particularly adapted for use with a composite spreading code, one that is made from combining elements of two or more constituent codes. Composite spreading codes are more particularly described in co-owned U.S. patent application Ser. Nos. 10/915,777, filed on Aug. 10, 2004. Autocorrelation peaks within such a code can be reduced as described in co-owned U.S. patent application Ser. No. 10/915,776, also filed on Aug. 10, 2004. Both of the above co-owned patent applications are hereby incorporated by reference.

In short, a composite spreading code may be explained as follows. Assume three constituent codes A, B and C, each having ten elements A∈$a_1, a_2, \ldots a_{10}$; B∈$b_1, b_2, \ldots b_{10}$; and C∈$c_1, c_2, \ldots c_{10}$. Each of the elements of A are combined (e.g., exclusively OR'd) with the first element of the B code to achieve a length 10 code segment $Ab_1$ with elements $a_1b_1$, $a_2b_1, a_3b_1, \ldots a_{10}b_1$. Another length 10 code segment $Ab_2$ is formed with the ten elements of the A code combined with the next element of the B code, so that the $Ab_2$ code segment has elements $a_1b_2, a_2b_2, a_3b_2, \ldots a_{10}b_2$. This continues for each of the B elements. The code segments are arranged seriatim to achieve a length 100 sub-code AB. To add in the C code, each element of the AB sub-code is combined with the first element of the C code to achieve a length 100 sub-code $ABc_1$, then again with the second element of the C code to achieve a length 100 sub-code $ABc_2$, and so forth for all elements of the C code. These sub-code segments $ABc_1, ABc_2, \ldots ABc_{10}$ are then arranged seriatim to achieve a length P=1000 ABC composite code.

Figure 3A:
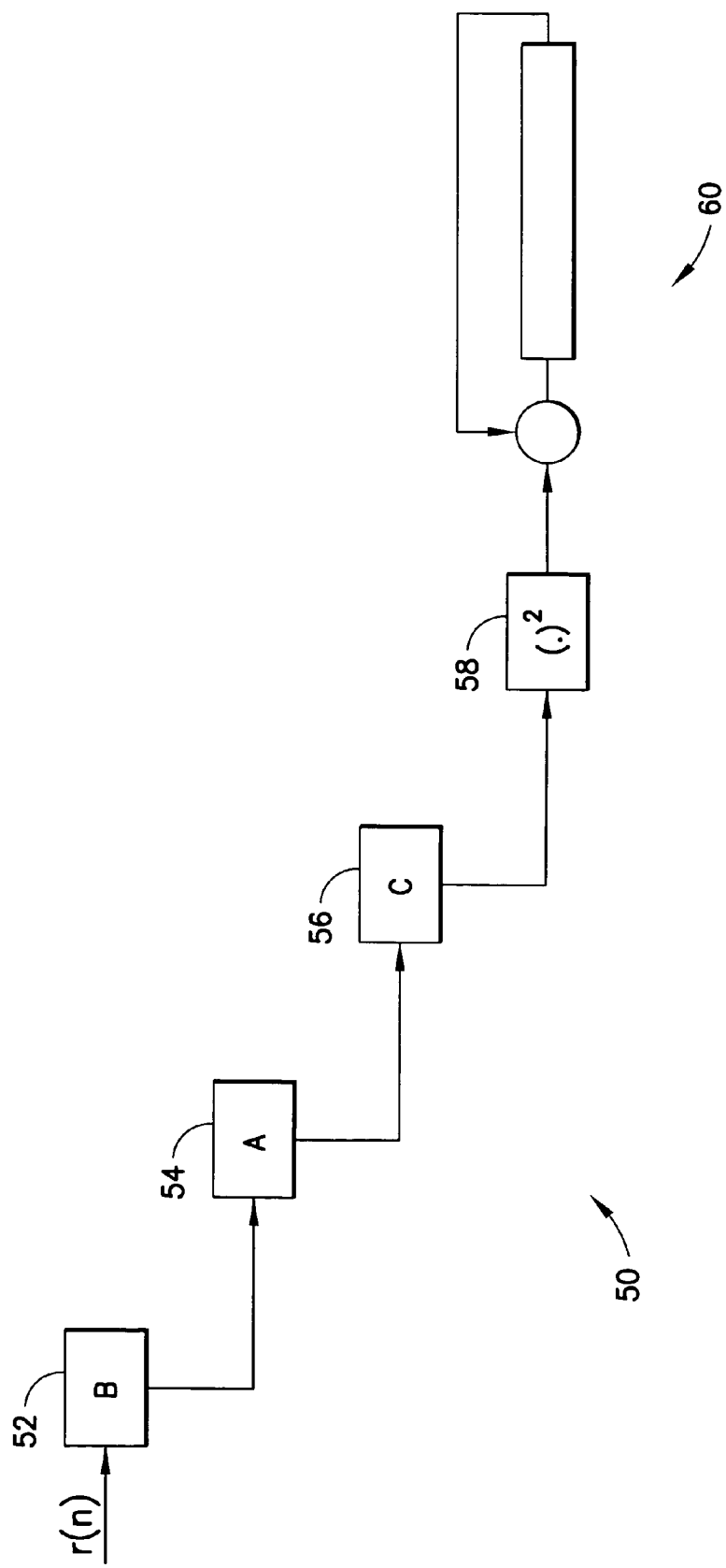
FIGS. 3A-3B are block diagrams, of varying detail, showing a matched filter decorrelator for despreading a composite spreading code made from three constituent codes A, B and C.
Figure 3B:
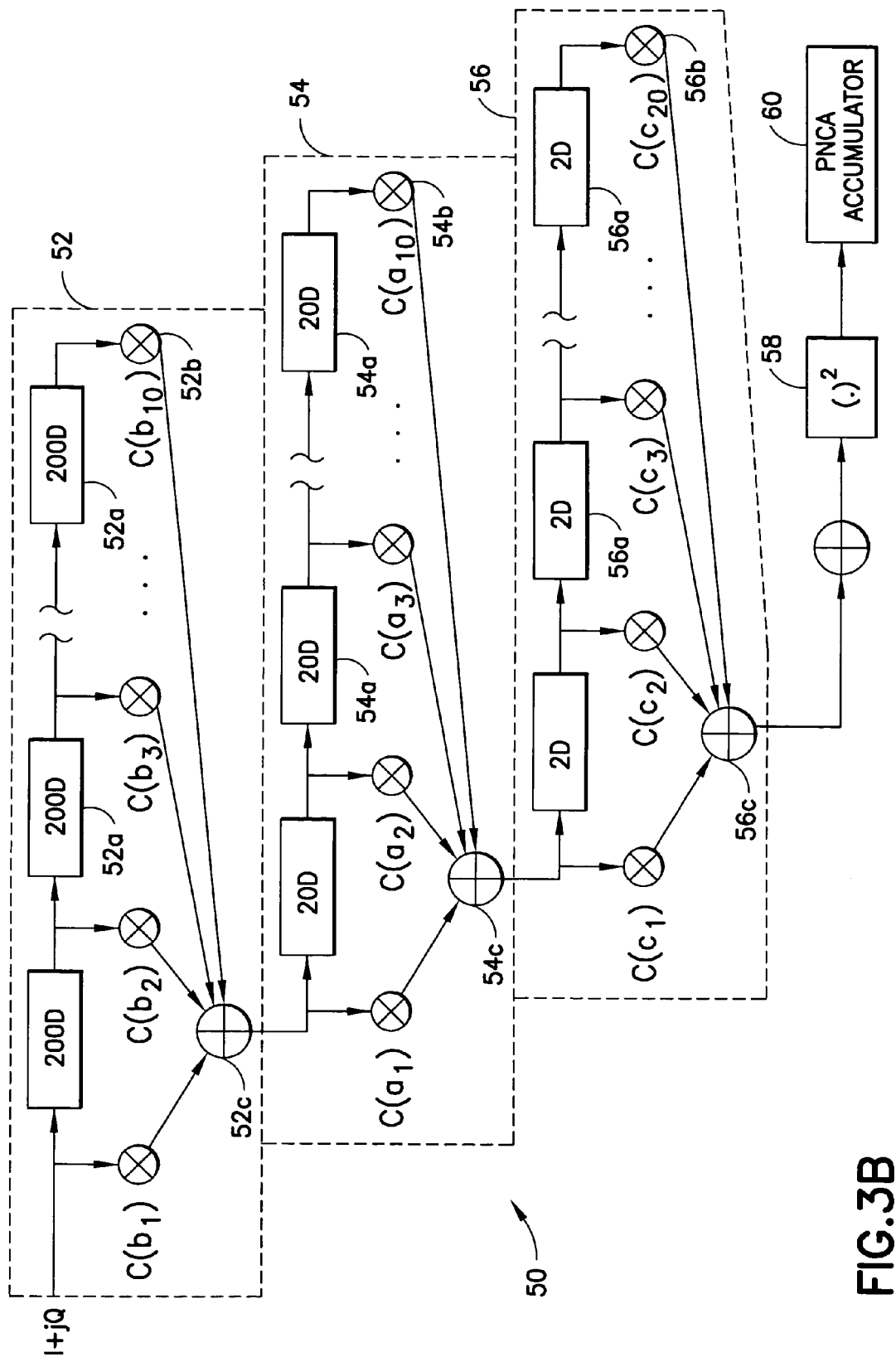

A despreader 50 for the above ABC composite code is shown in FIGS. 3A-B, though the order of despreading (shown as B, A, then C in FIG. 3A) is irrelevant except to gain hardware and computational burden advantages in the present invention. That is, the signal may be despread regardless of the order in which the constituent codes are despread from it. Such a despreader 50 may be disposed in a receiver at position 23 of FIG. 2A. A digitally sampled input r(n) is input into a first stage 52 where signal is partially despread using the elements of the B constituent code. Specifically, a series of delay elements 52a, each of a delay sufficient to segregate the elements of the B code, are in series in the first stage 52. A series of taps 52b, each coupled to at least an output or an input of the delay elements 52a, tap the values at any given time instant, multiply by the relevant tap weight $C(b_1), C(b_2)$ . . . $C(b_{10})$, and the results are added at a first stage adder 52c. That summed output is then input into a second stage 54 where the partially despread signal is further partially despread using the elements of the A constituent code in a similar manner, using delay elements 54a, taps and multipliers 54b, and an adder 54c of the second stage. That output is then input into a third stage 56 where the partially despread signal is finally despread using the elements of the C constituent code in like manner using delay elements 56a, taps and multipliers 56b, and an adder 56c of the third stage. Where the third stage is the final despreading stage, the delay elements 56a are unit delay elements. The output of the third stage 56 is squared 58 and input into a PNCA accumulator 60, where an energy peak indicates alignment of the samples r(n) with the code. As is evident from FIG. 3B, the different stages 52, 54, 56 include delay elements of different delay values to account for the positions within the composite ABC code at which the relevant tap weights/sub-code members are repeated in the overall composite ABC code. Delay values shown (200D, 20D, and D) are for a decorrelator 50 running at two samples per chip using the constituent code lengths above, in which case the PNCA accumulator 60 is of length 2P=2000 in this example.

The decorrelator 50 of FIGS. 3A-3B requires much less hardware and computational complexity to despread a signal spread with a composite PN code as compared to the prior art decorrelator 23 of FIG. 2B. In the above example of a length P=1000 code, the prior art decorrelator 40 of FIG. 2 requires 2000 taps and multiplies (at two samples per chip or double the chip rate), whereas the decorrelator of FIGS. 3A-3B require only forty taps and multiplies ($P_A+P_B+2P_C$), a savings of 1960 taps and multiplies. While the savings becomes even more significant for larger $P_{total}$, the number of taps and multiplies even in the embodiment of FIGS. 3A-3B grows to become very large at higher values of P (say, P=100,000), especially in the presence of Doppler or frequency uncertainty. While the use of a composite code allows this reduction, the secure environment of FIG. 1 garners against providing a training sequence that might otherwise be used to reduce the need to check each and every chip for alignment, lest the probability of intercept be raised significantly.

One of the drawbacks in the despreader 50 of FIGS. 3A-3B is that correlation is prone to large sidelobes (which may falsely indicate alignment) due to the frequent repetition of the short A constituent code. For a composite code ABCDE of length P=100,000, where each of A, B, C, D and E constituent codes are of length 10, the frequency of repetition is reduced by increasing the length of $P_A$ from 10 to 100 (and removing the E code to keep P=100,000) which decreases the side lobes but at the cost of increased hardware. For sampling twice per chip, the number of taps and multiplies increases from a total of 60 in the ABCDE code to a total of 140 in the ABCD code. Searching 30 frequency bins increases the hardware commitment from 1800 (60 taps*30 bins) to 4200 (140 taps*30 bins).

Figure 4A:
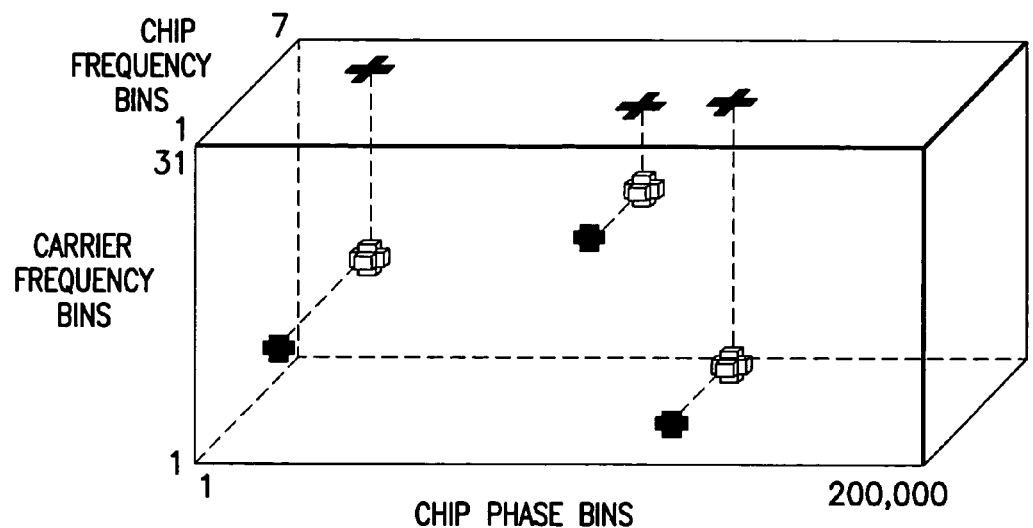
FIG. 4A is a diagram illustrating a volume of chip and carrier frequency uncertainty that must be resolved in despreading a received signal with unknown Doppler shift and varying clocks.
Figure 4B:
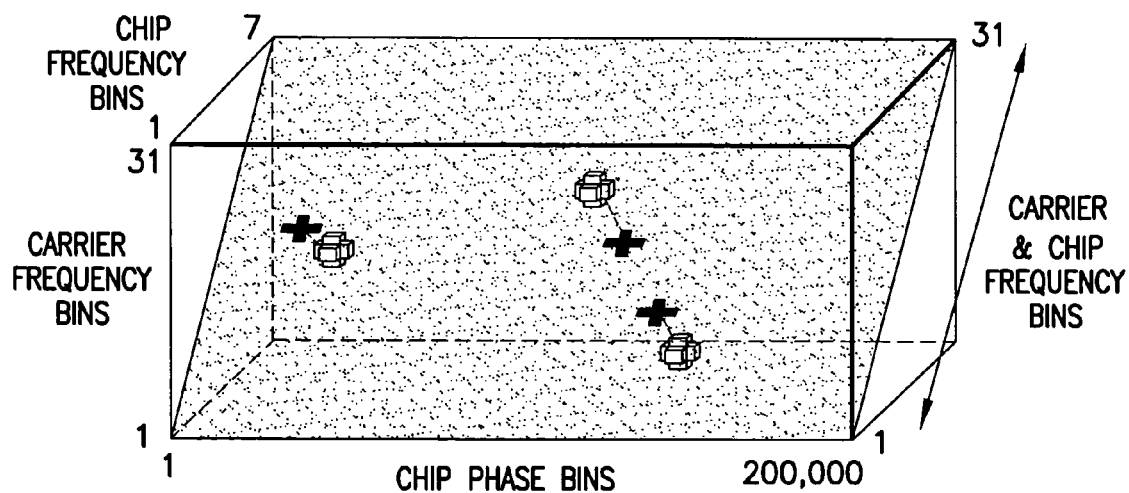
FIG. 4B is similar to FIG. 4A, but showing a reduced search surface that may be designed into a communication system by tying chip and carrier clocks.

Even if there were no Doppler shifts of the carrier and chip frequencies and perfect clocks were used at both the command 24 and hailing 34 nodes, finding PN chip phase alignment is a complex problem. However, assuming that the hailing node 34 and the command node 24 move at a rate of up to 970 km/hr relative to one another, and have imperfect clocks on the order of 1 ppm, then the Doppler shift will be almost 3.8 KHz at a 2 GHz carrier frequency. Taking not unusual assumptions, even the chip clock frequency can experience a Doppler and clock offset on the order of about 100 Hz, indicating that an autocorrelation peak can drift up to ±3 chips during a 16 symbol dwell interval (32 milliseconds). Assuming a target of no more than a ¼ carrier cycle rotation during each symbol and a PN code phase shift of no more than ½ chip during a 16 symbol dwell, there will be a total of 31 carrier frequency bins and 7 chip frequency bins. This is represented in FIG. 4A as an 'uncertainty cube' for a P=100,000 length code at double the chip rate, having a volume of (7*31*200,000)=43.4 million unique phase-frequency bins to search. However, it is not necessary to search the entire cube. Merely tying the chip and carrier clocks in the transmitter together ensures that any Doppler shift will be in the same direction for both clocks, and the uncertainty is reduced to lie along a surface as shown in FIG. 4B where the number of bins to search is reduced from 31*7=217 bins to only 31 bins. A decorrelator according to the present invention for searching each of the uncertainties of FIGS. 4A and 4B is shown in FIGS. 5A and 5B, respectively.

The present invention avoids the need to search every possible frequency bin for every tap/multiply by spinning the signal only after some partial despreading of a composite spreading code has already occurred. The weakest link in the secure environment of the communication system of FIG. 1 occurs during the preamble of the acquisition burst, where the command node 24 is unaware that the hailing node 34 is even sending a signal, let alone at what Doppler-shifted frequency it may be received (due to the relative unknown movement of the platforms 22, 34). To spread complexity among the receiver/command node 24 and the transmitter/hailing node 34 at this critical juncture, it is desirable that the transmitter spin the frequency of its acquisition burst preamble over an entire possible range, and the receiver 'park' and listen on a frequency within that range. This avoids the need to perform carrier bin searches at the receiver, freeing it to investigate any signal that it does receive and process it within a single preamble of an acquisition burst, while maintaining a high likelihood of detect for acquisition bursts. However, there still remains a carrier and phase uncertainty at the receiver, due to unknown Doppler and unsynchronized clocks.

Figures 1, 5A:
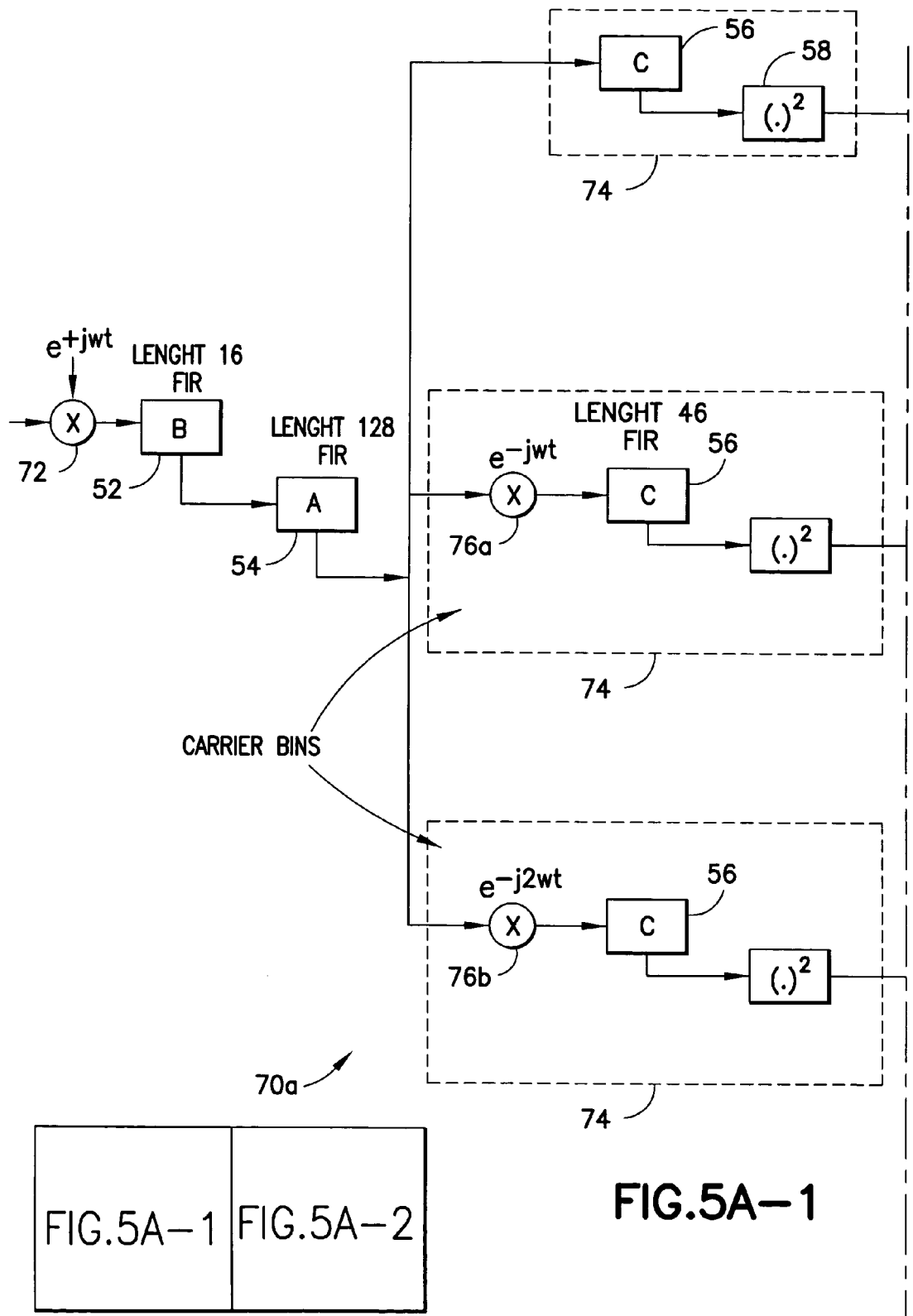
FIG. 5A is a block diagram of a decorrelator according to the preferred embodiment of the invention for searching the chip and carrier frequency uncertainty volume of FIG. 4A.
Figures 2, 5A:
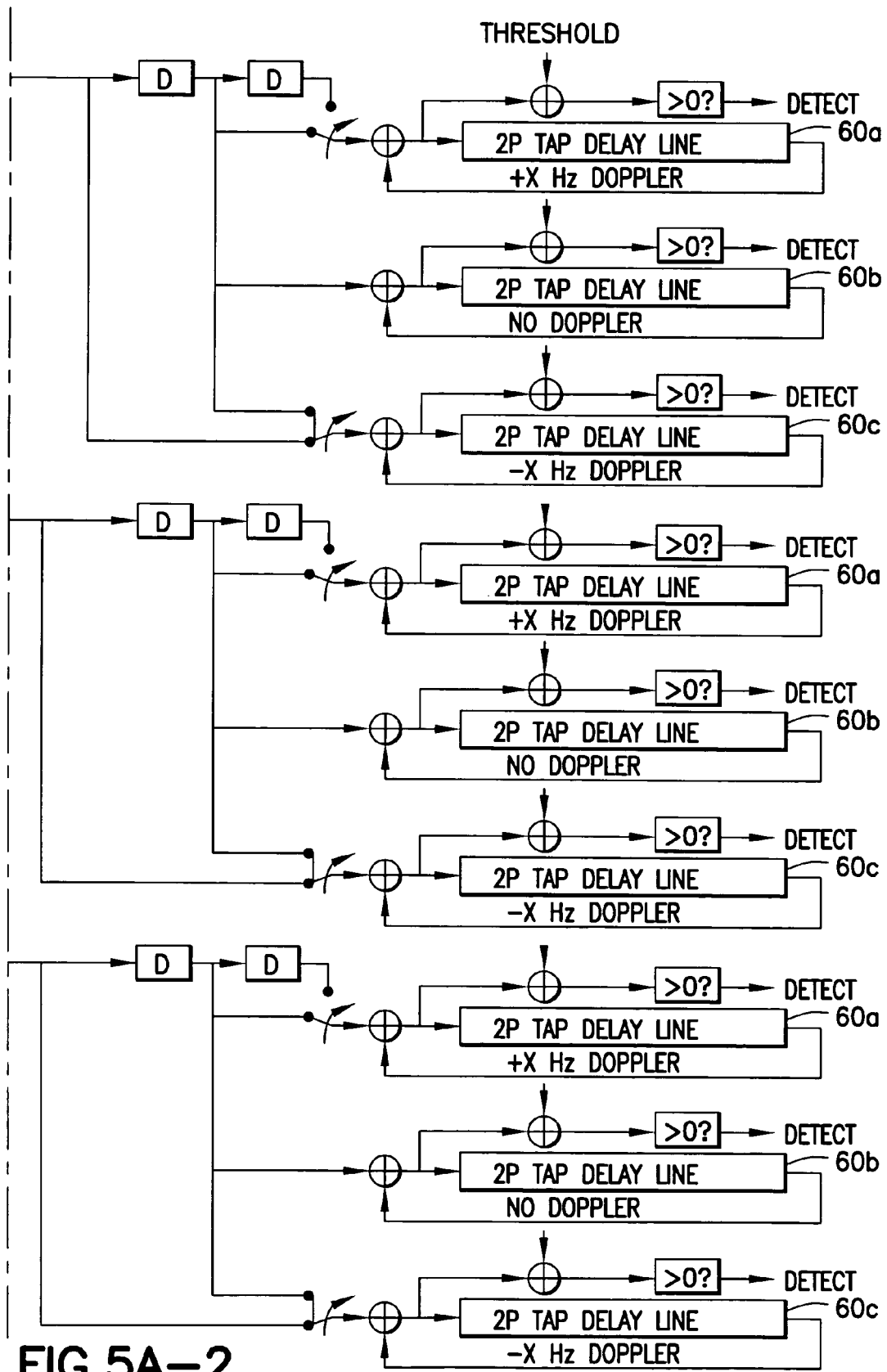
Figures 1, 5B:
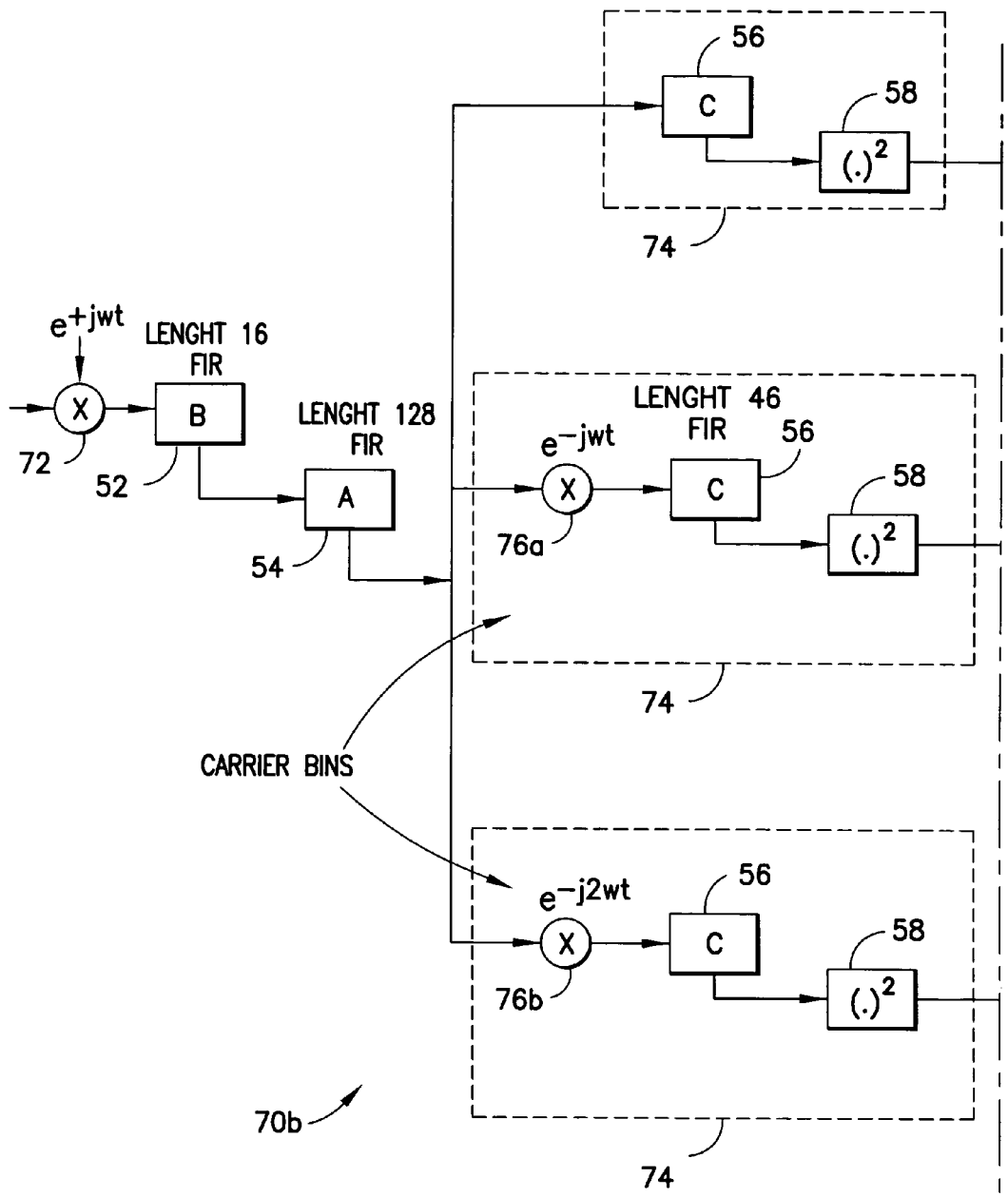
FIG. 5B is similar to FIG. 5A, but for searching the reduced uncertainty surface of FIG. 4B.
Figures 2, 5B:
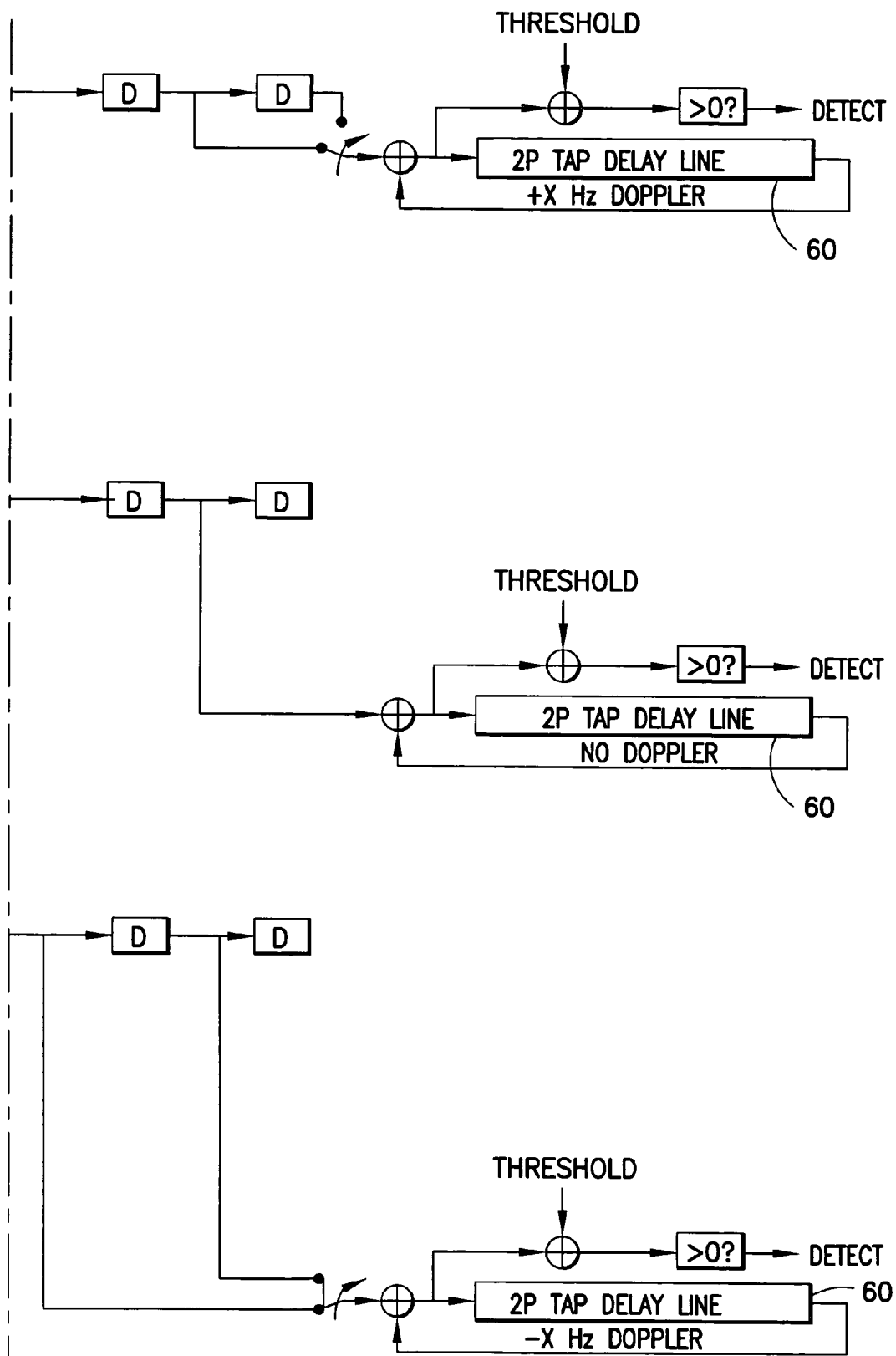

A decorrelator 70a-b according to a preferred embodiment of the present invention is shown in FIGS. 5A-5B. The overall concept is to partially despread the received signal using one or more, but not all, of the constituent codes A, B, etc. that were used to build the composite code, and spin the partially despread signal so that frequency-specific bins are searched only for the portion of the signal that is not yet despread. In the embodiment of FIG. 5A, chip frequency-specific bins are also included, whereas they are unnecessary in the embodiment of FIG. 5B. There is a hardware versus efficiency tradeoff in selecting which constituent code to despread in the final stage. Where the constituent code that is last in time to be despread is short, SNR will be higher. This implies a shorter burst preamble, which requires more Doppler bins to search because the longer dwell time would otherwise allow a larger rotation of the signal frequency. Though the final stage (C) would be lower in complexity where the shortest constituent code is last to be despread, the 2P tap delay lines 60 would be longer and multiplied by a larger number to realize the intended energy peak. As noted previously, the signal may be despread by any order of the A, B, C sub-codes in the receiver (e.g., A sub-code in the first stage, C sub-code in the second stage, etc.), but sidelobes are reduced by the transmitter's selection of where to integrate the longer sub-code when building the overall composite code.

Assume for the description of FIGS. 5A-5B that the composite code ABC is formed from constituent codes A, B and C having relative numbers of members $P_A$=100, $P_B$=10, and $P_C$=10, so the overall composite code has length P=10,000. Assume that the transmitter reduces sidelobes by combining the sub-codes A, B, C in that order. Because the A and B constituent codes repeat more frequently than the C constituent code, they are despread first. The phase of a digitally sampled complex input signal r(n) from the channel is spun at a first phase rotator 72 to a frequency of "w", shown as a multiplication by $e^{jwt}$. This puts the signal in a frequency bin. The first phase rotator 72 limits the phase of each symbol that it outputs within a range, preferably 90°. Phase rotation is limited by dwell time, as noted above. This is because the first phase rotator 72 seeks to stop a frequency oscillation of the incoming signal. The incoming signal has a changing phase that can be considered a rotating vector. Where the incoming signal rotates in one direction, the phase rotator rotates the phase of that incoming signal in the opposite direction, attempting to eliminate the phase rotation that is due to the Doppler effect of the hailing 34 and command 24 nodes moving relative to one another. [frequency is the derivative of phase with respect to time, so rotation of phase per unit time defines the frequency. Rotating phase faster means change in phase per unit time increases and frequency increases, so the phase rate of rotation of defines frequency, and the phase rotator 72 may operate in the frequency domain also with the same result as stated above.] However, the receiver is unaware of what the proper frequency/phase rotation of the incoming signal should be, because the Doppler shift between hailing 34 and command 24 nodes (FIG. 1) is unknown during an acquisition burst. Therefore, the phase rotator operates to limit rotation of the output signal to a certain range per symbol so that the despreading in the first 52 and second 54 stages can continue (e.g., the signal is not spinning too fast) and the carrier frequency bins are limited to a relatively small range to search.

Each of the final bins limit phase rotation to no more than 90 degree per symbol. The first phase rotator 72 limits rotation so that the entire frequency range in which the signal may lie is scanned by the set of frequency bins within the dwell time, so the overall frequency range is the number of bins times rotation per bin. As depicted in FIG. 5A, the first phase rotator 72 seeks to put the signal frequency at one end or at a center of the frequency range of all bins. This is unnecessary if there were no Doppler shift (or if it were known) and all clocks of the various nodes were synchronized. Assume for example that there are ten frequency bins. If there is a rotation of +/−900 degrees per symbol, the bin centers would be spaced about 180 degrees per symbol, because rotation of 90 degrees per symbol dwell (edge to center) loses only 0.9 dB of signal strength & each bin can search within a rotation of 90 degrees from a center frequency. Each bin is set up to encompass no more than 180 degrees per symbol. Whatever the actual carrier frequency is when the discovery burst arrives, it will always be within 90 degrees of a bin.

The counter-spun signal output from the first phase rotator 72 is then despread by a first stage despreader 52 (which can also be termed a first FIR matched filter) to despread the signal with the B code, followed by a second stage 54 or second matched filter for despreading with the A code. These stages 52, 54 are as previously described with reference to FIGS. 3A-3B, and in the incorporated references. For any of these stages 52, 54, the length depends upon the size of the constituent sub-code that the particular stage 52, 54 despreads, in this case, 10 and 100, respectively. At this point in the circuit, the entire composite ABC code is despread over the length of the AB code, and the carrier rotation is still large except within one bin (e.g., within 1800 degrees with ten bins, each separated from their nearest neighbor by 180 degrees). The AB matched filter outputs are then input in parallel to one of several bin-specific processing blocks 74, Each bin-specific processing block 74 save one (which operates on the bin centered at "w", as determined by the first phase rotator 72) has a bin-specific phase rotator 76a, 76b that back-spins its input by various amounts (e.g., −w, −2w as shown) for each of the remaining carrier frequency bins. In each bin-specific processing block 74, and coupled to the output of the bin specific phase rotator 76a, 76b (where present) is a third stage 56 or third FIR matched filter that despreads the remaining C code from the signal. The same result may be obtained by spinning the taps 56b (FIG. 3B) in the final stage of despreading, rather than spinning the input to the final stage despreader. In this case, each of the bin-specific processing blocks are in parallel, and the bin-specific phase rotators 76a-b as illustrated are not necessary to adjust the frequency of the signal input to the serial line of delay elements. Instead, the taps multiply by the relevant tap weights (members of the C code) and also multiply by a frequency adjustment prior to the final stage adder 56c (FIG. 3B). The bin-specific phase rotators are within the third despreading stage 56, either co-located with the taps or in series with taps that multiply the delayed samples by the members of the C constituent code. The hardware is then a complex multiplier or a serial pair of multipliers. Where combined into one multiplier, the taps may be considered as phase rotating taps.

The outputs of each of the three illustrated parallel third despreading stages 56, each for despreading with the (final) C sub-code, are essentially despread outputs of an ABC code matched filter, each in a different frequency bin. One bin-specific processing block 74 will be described, though all three are identical save for the particular frequency bin searched. [It is noted that the first phase rotator 72 as depicted may be eliminated and replaced by a bin-specific phase rotator 76 at the bin-specific processing block 74 not depicted in FIG. 5A as having one.] The output of the third matched filter 56 is squared 58 to obtain an energy estimate that is fed into each of a group of three or more PNCA accumulators 60a-c or tap delay lines for that particular bin. The plurality of accumulators 60a-c coupled to each bin-specific processing block 74 operate to resolve the chip frequency when the entire volume of FIG. 4A is searched. An averaging and detect circuit may also be present (not shown).

Chip frequency is due to the fact that the sampling clock of the transmitter (the hailing node 34) may be asynchronous with the sampling clock of the receiver (the command node 24) in both sampling instants and sampling interval (or chip frequency). Differences in sampling instances is largely irrelevant. Resolving the difference in sampling interval is similar to resolving an unknown carrier frequency Doppler shift. The output of a bin-specific processing block 74 is input into each of three accumulators 60a-c. Where the sampling intervals between transmitter and receiver are identical (or nearly so), the center accumulator 60b will be the one to show an energy peak and alignment (if it occurs in that carrier frequency bin). Where the transmitter sample intervals are shorter or longer than those of the receiver, the upper 60a or lower 60c accumulator will be the one to show an energy peak and alignment.

In the case of a chip frequency offset, the autocorrelation peak of the arriving burst drifts with the dwell, and the energy of the output of the third (despread ABC) matched filter output 56 is accumulated over the accumulators 60a-c of the relevant bin-specific processing block 74. The accumulators are preferably of length 2P each, where P is the processing gain that varies system to system. In the present preferred embodiment, P=10,000 and each accumulator holds 20,000 despread values due to the doubled chip rate. For terminology, note that the elements of the C code are applied to the partially despread signal at each of the bin-specific processing blocks 74, but the signal is only (fully) despread in one of the eventual accumulators.

As previously noted, when an energy peak in any of the accumulators 60a-c is reached (e.g., when a predetermined threshold is exceeded), alignment of the code is confirmed. This energy peak triggers a processor to assign a burst receiver from a pool of such burst receivers to setup, adjust phase to that of the triggering accumulator 60a-c, and synchronize with the synch pattern that may be embedded at the juncture between a burst preamble and burst payload to enable the receiver to lock onto the more secure code used for the burst payload (preferably not a composite code). The accumulator 60a-c that triggers on an energy peak informs as to the carrier frequency and chip frequency of the burst preamble 38.

The above description of FIG. 5A describes a decorrelator 70 that searches the entire uncertainty cube of FIG. 4A. Extended for 30 carrier bins and 7 chip frequency bins, the resulting hardware commitment is then, for a length 10,000 composite code sampled at twice the chip rate with $P_A=100$, $P_B=10$, and $P_C=10$, ten taps and multiplies for the B code, one hundred taps and multiplies for the A code, and twenty taps and multiplies for the C code in each of thirty bins of each of seven chip frequency bins, or a total of 4310 taps and multiplies.

Tying the carrier and chip clocks together as described above reduces the uncertainty to be searched to the uncertainty surface of FIG. 4B. A decorrelator 70b to search only that 'surface' is shown in FIG. 5B, which is identical to the decorrelator 70a of FIG. 5A except that each processing block 74 includes only one accumulator 60. As compared to the embodiment of FIG. 5A, the total hardware commitment is then unchanged for despreading the A and B codes, and reduced for the C code to twenty taps and multiplies in each of thirty carrier frequency bins, or a total of 710 taps and multiplies. Either of FIG. 5A or 5B compare quite favorably with a prior art decorrelator such as that of FIG. 2B, which would require 4.2 million taps and multiplies (20,000*30*7) to despread a length 10,000 PN code at two samples per chip.

Figure 6:
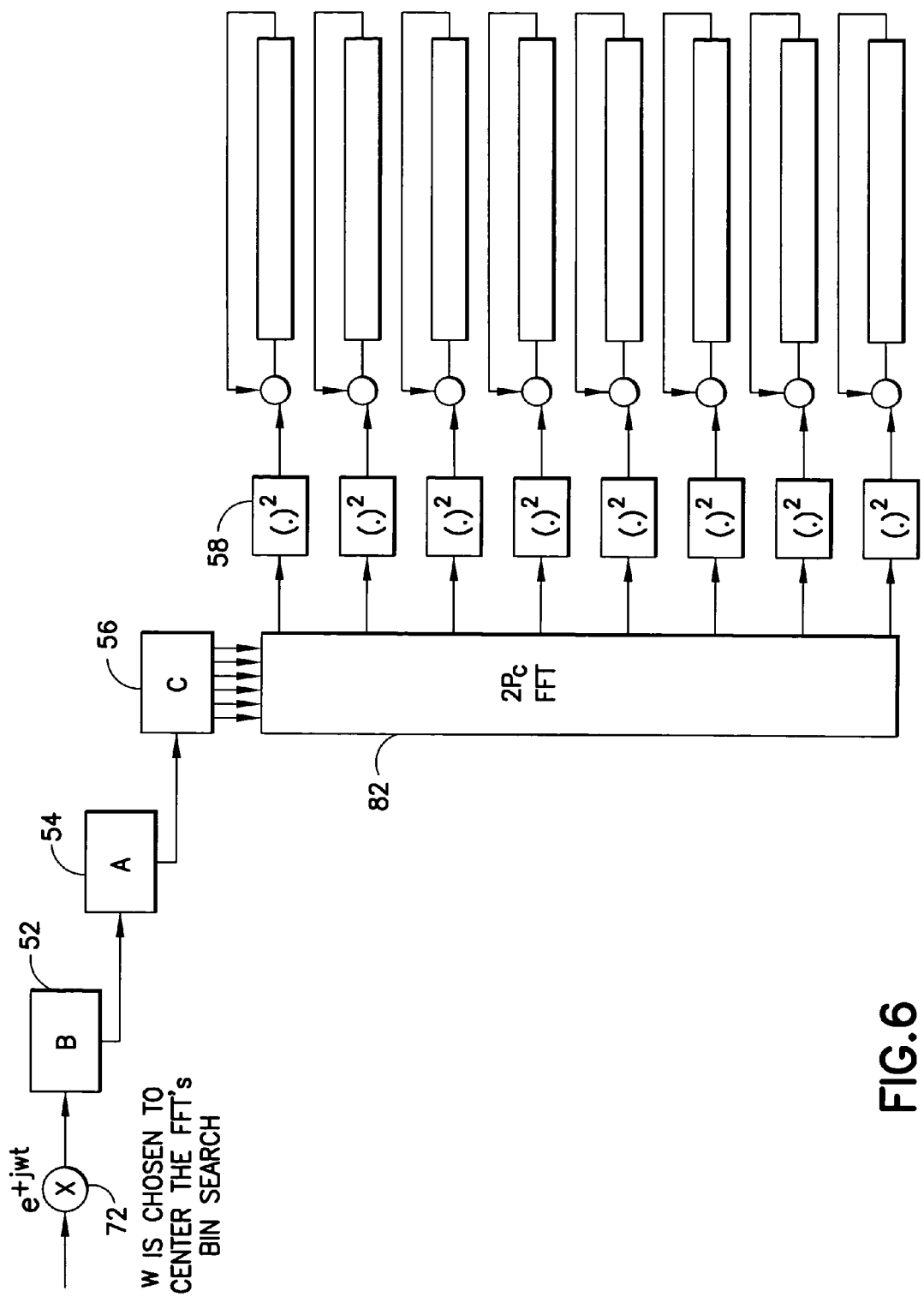
FIG. 6 is a block diagram of a decorrelator according to an alternative embodiment of the present invention.

Either of FIGS. 5A and 5B are variations on the preferred embodiment of the present invention. FIG. 6 is a block diagram of an alternative embodiment of a decorrelator 80 according to the present invention. Despreading of the A and B constituent codes is similar to that described with reference with FIGS. 5A and 5B, with the exception that the first level phase rotator 72 spins the digital input signal to a phase, denoted as "w", that is the center of a fast Fourier transform FFT bin search. To despread the C constituent code, the despread AB code is tapped and multiplied by the tap weights, which are the members of that C code. However, in the FFT alternative embodiment, these tap outputs (the samples multiplied by the tap weights) are not summed but separately entered in parallel to a FFT block 82. The FFT is taken using the shorter length C code after the despreading of the A and B codes has been completed to reduce the overall computational burden. Where the length of the C constituent code is $P_C$, the complexity of the FFT is then $P_C \log_2 (P_C)$. Each FFT transformed output is then squared 58 and input into a PNCA accumulator 60, of which there are $P_C$=10 in this example (eight depicted in FIG. 6). The embodiment of FIG. 6 can of course work equally well using a discrete Fourier transform DFT, which adds some computational complexity.

It is considered that a composite code of minimum length $P_{total}$=10,000 will yield sufficient security for an acquisition burst in the vast majority of reasonably foreseeable circumstances. The table below is a comparison of hardware savings for a length P=20,000 composite spreading code made from constituent codes of length A=10, B=20, and C=100, where the receiver searches 30 carrier frequency bins.

Change this table so A=10, B=20, C=100 so P=20,000 (line 3 is essential advantage of invention, claim it)

TABLE 1

Comparison of Hardware and Computational Burden

| Approach | Number of Taps/Multiplies |
| --- | --- |
| Prior Art General Despreader (FIG. 2B) | 20K * 30 = 600,000 |
| Composite Despreader (FIGS. 3A-3B) | (10 + 20 + 100) * 30 = 3900 |
| Preferred embodiment (carrier bins only, FIG. 5B) | 10 + 20 + (100 * 30) = 3030 |
| FFT embodiment (carrier bins only, FIG. 6) | 10 + 20 + [100 * log$_2$(100)] = 696 |

It is noted that while the multiplies in the FFT embodiment are non-binary, so the comparative advantage for the FFT embodiment is not as straightforward as Table 1 above would suggest, as the binary multiplies of the other embodiments use less CMOS gates than the non-binary FFT multiplies. Nevertheless, the present invention, in either embodiment, offers a great advantage in reduced hardware and computational burden as compared to the general despreader of FIG. 2B or the decorrelator of FIGS. 3A-3B (which is itself described and claimed in co-owned and incorporated patent application Ser. No. 10/915,777, filed on Aug. 10, 2004.

For all but the final stage of despreading, an alternative approach termed a subsequence accumulation SAM filter may be used. The SAM filter is described in co-owned U.S. patent application Ser. No. 11/136,782, filed on May 24, 2005, cross-referenced above and hereby incorporated by reference in its entirety.

It is noted that the drawings and description presented herein are illustrative of the invention and not exhaustive. While there has been illustrated and described what is at present considered to be preferred and alternative embodiments of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method for decorrelating a received signal that is spread with a composite spreading code, said composite spreading code comprised of at least a first and a second constituent code, the method comprising:

applying a time varying phase rotation to a received signal to place the received signal into a plurality of frequency bins despreading the phase rotated signal with a first spreading code to achieve a partially despread signal;

applying a second constituent code to the partially despread signal among a plurality of frequency bins;

for each of the frequency bins, accumulating outputs into a bin-specific accumulator; and, determining that the decorrelated signal is that signal corresponding to a bin-specific accumulator that exhibits an energy peak.

2. The method of claim 1 wherein the first constituent code is longer than the second constituent code.

3. The method of claim 1 wherein the composite code comprises a plurality of constituent codes, further wherein none of the plurality of constituent codes are longer than the first constituent code.

4. The method of claim 1 wherein the composite code comprises a plurality of constituent codes, further wherein none of the plurality of constituent codes are shorter than the second constituent code.

5. The method of claim 1, wherein the composite code comprises a plurality of constituent codes;

and further wherein despreading the phase rotated signal with the first spreading code to achieve a partially despread signal comprises, in turn, serially despreading the phase rotated signal with each of the plurality of constituent codes, except the second constituent code, to achieve the partially despread signal.

6. The method of claim 1 wherein applying the second constituent code to the partially despread signal among a plurality of frequency bins comprises, in parallel:

applying the second constituent code to the partially despread signal and summing the result; and for each of the remaining frequency bins, applying a further time varying phase rotation, applying the second constituent code, and summing the result.

7. The method of claim 1 wherein applying the second constituent code to the partially despread signal among a plurality of frequency bins comprises, in parallel:

applying the second constituent code to the partially despread signal and summing the result; and applying the second constituent code to the partially despread signal, rotating each tap at which the second constituent code is applied to a unique frequency bin, and summing the result.

8. The method of claim 1 wherein applying the second constituent code to the partially despread signal among a plurality of frequency bins comprises:

applying the second constituent code to the partially despread signal;

outputting in parallel each tap result at which the second constituent code is applied; and performing a Fourier transform on each tap result.

9. The method of claim 8, wherein the Fourier transform is over a plurality of frequency bins, and further wherein phase rotating a received signal comprises phase rotating the received signal to a center of the plurality of frequency bins.

10. The method of claim 1, wherein accumulating outputs from each of the frequency bins into a bin-specific accumulator comprises selectively accumulating outputs from each of the frequency bins into one of at least three frequency selective accumulators.

11. A decorrelator for despreading a composite spreading code, said composite spreading code comprised of at least a first and a second constituent code, the decorrelator comprising:

a first phase rotator for rotating a received signal into a plurality of frequency bins;

a first stage having an input coupled to an output of the first phase rotator for despreading the rotated signal with a first constituent code to achieve a partially despread signal;

a second stage having an input coupled to an output of the first stage for applying a second constituent code to the partially despread signal among a plurality of frequency bins; and a plurality of accumulators each having an input coupled to an output of the second stage.

12. The decorrelator of claim 11, wherein the first constituent code is longer than the second constituent code.

13. The decorrelator of claim 11, wherein the composite code comprises a plurality of constituent codes, further wherein none of the plurality of constituent codes are longer than the first constituent code.

14. The decorrelator of claim 11, wherein the composite code comprises a plurality of constituent codes, further wherein none of the plurality of constituent codes are shorter than the second constituent code.

15. The decorrelator of claim 11, wherein the composite code comprises a plurality of X constituent codes, wherein X is an integer greater than two, the decorrelator further comprising for each of X−2, an interim stage having an input coupled to the output of the first stage for despreading the input thereto with a unique one of the constituent codes except the first and second constituent codes, wherein each of the interim stages are arranged in series with one another.

16. The decorrelator of claim 11, wherein the second stage comprises a plurality bin-specific processing blocks in parallel with one another, each of the said bin-specific processing blocks comprising:

a plurality of unit delay elements in series with one another;

a plurality of taps each having an input coupled to at least one of an input and an output of a unit delay element, each tap for multiplying by an element of the second constituent code;

a second stage adder having inputs coupled to an output of each tap;

and where at least all but one of the bin-specific processing blocks comprises a phase rotator disposed between the output of the first stage and the plurality of unit delay elements.

17. The decorrelator of claim 16, wherein the a plurality of accumulators each having an input coupled to an output of the second stage comprise a plurality of accumulator groups, each of said accumulator groups comprising at least three accumulators in parallel.

18. The decorrelator of claim 11, wherein the second stage comprises a plurality of bin-specific processing blocks in parallel with one another, each of the said bin-specific processing blocks comprising:

a plurality of unit delay elements in series with one another;

a plurality of taps each having an input coupled to at least one of an input and an output of a unit delay element, each tap for multiplying by an element of the second constituent code;

a second stage adder having inputs coupled to an output of each tap;

and where each tap in at least all but one of the bin-specific processing blocks comprises a phase rotating tap for rotating an input signal into a frequency bin that is unique as compared to all other bin-specific processing blocks.

19. The decorrelator of claim 18, wherein the a plurality of accumulators each having an input coupled to an output of the second stage comprise a plurality of accumulator groups, each of said accumulator groups comprising at least three accumulators in parallel.

20. The decorrelator of claim 11, wherein the second stage comprises:

a plurality of unit delay elements in series with one another;

a plurality of taps each having an input coupled to at least one of an input and an output of a unit delay element, each tap for multiplying by an element of the second constituent code;

the decorrelator further comprising a Fourier transform block having inputs coupled to an output of each of the taps and each of a plurality of outputs coupled to a unique one of the accumulators.

21. The decorrelator of claim 20, wherein the Fourier transform block operates over plurality of frequency bins, and further wherein the first phase rotator is for outputting a received signal with a frequency at the center of the bins.

* * * * *